(12) United States Patent
Gonidec et al.

(10) Patent No.: US 12,305,569 B2
(45) Date of Patent: May 20, 2025

(54) DISTRIBUTED PROPULSION WITH OFFSET PROPULSION MODULES

(71) Applicants: INSTITUT SUPERIEUR DE L'AERONAUTIQUE ET DE L'ESPAC, Toulouse (FR); SAFRAN, Paris (FR); SAFRAN AIRCRAFT ENGINES, Paris (FR)

(72) Inventors: Patrick Gonidec, Moissy-Cramayel (FR); Miguel Angel Aguirre, Moissy-Cramayel (FR); Sébastien Duplaa, Pompertuzat (FR); Bernard Robic, Moissy-Cramayel (FR); Benoit Rodriguez, Moissy-Cramayel (FR); Nicolas Jérôme Jean Tantot, Moissy-Cramayel (FR)

(73) Assignees: INSTITUT SUPERIEUR DE L'AERONAUTIQUE ET DE L'ESPACE, Toulouse (FR); SAFRAN, Paris (FR); SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/769,554

(22) PCT Filed: Oct. 14, 2020

(86) PCT No.: PCT/FR2020/051812
§ 371 (c)(1),
(2) Date: Apr. 15, 2022

(87) PCT Pub. No.: WO2021/074521
PCT Pub. Date: Apr. 22, 2021

(65) Prior Publication Data
US 2024/0133339 A1 Apr. 25, 2024
US 2024/0229709 A9 Jul. 11, 2024

(30) Foreign Application Priority Data
Oct. 15, 2019 (FR) .................................. 1911489

(51) Int. Cl.
*F02C 3/04* (2006.01)
*B64D 27/10* (2006.01)
*F04D 17/02* (2006.01)

(52) U.S. Cl.
CPC ................ *F02C 3/04* (2013.01); *B64D 27/10* (2013.01); *F04D 17/02* (2013.01)

(58) Field of Classification Search
CPC ........ B64D 27/20; B64D 29/04; B64D 33/04; B64D 27/10; F02C 3/04; F04D 17/02
See application file for complete search history.

(56) References Cited

U.S. PATENT DOCUMENTS 3,442,082 A * 5/1969 Peterson .................... F02K 3/12
60/761
11,840,958 B2 * 12/2023 Kupratis ................... F02K 3/12
(Continued)

FOREIGN PATENT DOCUMENTS

GB 1 545 365 A 5/1979

OTHER PUBLICATIONS

French Search Report dated Jul. 1, 2020 in French Application No. 1911489.
(Continued)

*Primary Examiner* — Todd E Manahan
*Assistant Examiner* — Rodolphe Andre Chabreyrie
(74) *Attorney, Agent, or Firm* — Sughrue Mion, PLLC

(57) ABSTRACT

A propulsion unit including: a gas generator including a compressor, a combustion chamber, a turbine, at least two compressed-air propulsion modules, each propulsion module including: a fan, a compressed-air turbine configured to
(Continued)

drive the rotation of the fan, a manifold allowing the respective turbines of the compressed-air propulsion modules to be supplied with compressed air, wherein the manifold is configured to collect and mix: at least a portion of the flow that has passed through the combustion chamber of the gas generator, typically as it leaves the turbine, and at least one bypass flow, the bypass flow being a flow of air which is not passed through the combustion chamber of the gas generator.

12 Claims, 7 Drawing Sheets

(56) References Cited

U.S. PATENT DOCUMENTS

| | | | |
|---|---|---|---|
| 2002/0190159 A1* | 12/2002 | Franchet | F02K 3/075 244/74 |
| 2005/0081509 A1* | 4/2005 | Johnson | B64D 33/02 60/761 |
| 2005/0211822 A1 | 9/2005 | Franchet et al. | |
| 2018/0051627 A1* | 2/2018 | Chandler | F01D 25/30 |

OTHER PUBLICATIONS

Written Opinion of the International Searching Authority dated Feb. 11, 2021 in International Application No. PCT/FR2020/051812.
International Search Report dated Feb. 11, 2021 in International Application No. PCT/FR2020/051812.

* cited by examiner

DISTRIBUTED PROPULSION WITH OFFSET PROPULSION MODULES

CROSS REFERENCE TO RELATED APPLICATIONS

This application is a National Stage of International Application No. PCT/FR2020/051812 filed on Oct. 14, 2020, claiming priority based on French Patent Application No. 1911489 filed on Oct. 15, 2019.

GENERAL TECHNICAL FIELD

The present application relates to the field of propulsion assemblies in aerospace and in particular distributed propulsion.

Distributed propulsion consists in having a power generator at a place on the aircraft and transmitting this power to a plurality of members that create a propulsive force, distributed across various places of the airplane.

In particular this configuration makes it possible to distribute the thrust across several fans led by one and the same generator and thus forming a propulsion unit with a high bypass ratio (16:1 or even 30:1 and above) while keeping fans of individual size that can be integrated into the airplane. In addition, this distribution of the thrust allows topologies of geometrical and aerodynamic arrangements minimizing the energy variations over the aircraft/propulsion system assembly, options generally impossible to envision with conventional propulsion assemblies where each generator leads only a single fan.

The problem posed is therefore to transfer a high power (10 to 60 MW) from a power generator (often a gas generator) toward fans which are more or less remote from it on the airplane.

BACKGROUND

The current prior art differentiates between two types of distributed propulsion: "short" distributed propulsion wherein the engine drives several fans but where these fans remain close to it (the term "close" should be understood to mean that the distance between the engine centerline and the axis of the fans is less than three times the diameter of the fan) and "long" distributed propulsion wherein the fans are distant (the term "distant" should be understood to mean that the preceding distance is three times greater than the diameter of the fan) of their power generator.

Two power transmission technologies have already been used:
- mechanical transmission (shaft, various gearings): due to the limitations on overall dynamic, flexibility/rigidity, and mass, this mode of transmission is reserved almost exclusively for short distributed propulsion,
- electrical transmission (electrical generator coupled to the gas generator, electrical converters, electrical cables, electrical motor coupled to each fan): this configuration requires advanced technology to reduce Joule effect losses in the power cables of the fan motors but also in the very wirings of the motors and alternators needed for long distributed propulsion; in addition, the weight must be kept within reasonable proportions. The competitiveness of such electrical transmission is also conditional on the availability of equipment with high power density (typically greater than 250 kW/kg).

These two solutions present difficulties (lubrication, mechanical complexity, adjustment and precision; Joule loss effects, voltage, weight).

A third solution has been investigated in a preliminary manner: it consists in supplying compressed air to one or more turbines coupled to a single fan via a single gas generator.

At present there are two variants thereof, illustrated by FIGS. 1a and 1b.

In FIG. 1a, a generator A1 conventionally comprises a compressor A11, a combustion chamber A12 and a turbine A13 (driving the compressor A11 by way of a mechanical coupling shaft). The generator A1 powers two propulsion modules A2 supplied by the air flow exiting the turbine A13. The propulsion module A2 comprises a fan A21, rotationally driven by a drive turbine (via a shaft), which is itself driven by this air flow. The drive turbine is a turbine linked to the radial tip of the fan A21 (tip turbine). There is little load loss in the pipe A3 (due to the proximity of the generator and fans) linking the turbine A13 to the drive turbine of the propulsion module A2, but this puts a practical limit on integration into an aft mount on airplanes with a so-called "double bubble" twin elliptical cross section. In addition, the exhaust gases are very hot (over 1100 K at peak temperature encountered through all operating conditions), which requires specific materials and devices, which are expensive (even the Oxide/Oxide ceramic becomes hard to use), tolerated here since only small quantities are needed for the pipe A3 which is very short.

FIG. 1b, a generator B1 conventionally comprises a compressor B11, a combustion chamber B12 and a turbine B13 (driving the compressor by way of a mechanical coupling shaft). A plurality of propulsion modules B2 are remote. Here, the air flow is entirely drawn from the intake of the combustion chamber B12, at the output of the compressor B11 then sent to the drive turbines B22 of the propulsion modules B2, which drive the fans B21. However, the pressures involved (approximately 50 bars, at a temperature of approximately 1000 K), besides the fact that they require suitable materials which are heavy, require the use of small pipes B3, limiting the individual flow rate routable through each pipe, which means that this system is usable only for a large number of small fans.

SUMMARY

With regard to this, the application provides in a first aspect a propulsion unit comprising:
 a gas generator comprising:
  a compressor,
  a combustion chamber, configured to receive compressed air via the compressor,
  a turbine, configured to rotationally drive the compressor using the gases coming from the combustion chamber,
 at least two compressed-air propulsion modules, each propulsion module comprising:
  a fan,
  a compressed-air turbine, configured to rotationally drive the fan,
  a manifold used to supply compressed air to the respective turbines of the compressed-air propulsion modules,
  wherein the manifold is configured to collect and mix at least a portion of the flow that has crossed the combustion chamber of the gas generator, typically at the outlet of the turbine, and at least one bypass flow, said bypass flow being an air flow which has not crossed the combustion chamber of the gas generator.

Owing to this mixing of the flows, the temperature of the compressed air is reduced with respect to the technology of FIG. 1a, which allows for a more significant separation of the propulsion modules. The cost of the materials of the routing ducts and the propulsion modules and their weight are also reduced. By comparison with the technology of FIG. 1b, the pressures involved are clearly lower, which allows for wider and thinner ducts (for the material), and therefore use on propulsion modules of a larger individual size owing to a reduction of the mass of the ducts and a better optimization of the turbines coupled to the fan.

The gas generator comprises a longitudinal axis corresponding to an axis of rotation of the turbine and each propulsion module comprises a longitudinal axis corresponding to an axis of rotation of the compressed-air turbine. Due to the fact that it is a so-called "remote" propulsion unit, the longitudinal axis of the gas generator and that of at least one propulsion module is not colinear. Advantageously, none of these axes is colinear with that of the gas generator.

In an embodiment, the manifold collects virtually the entirety or the entirety of the flow crossing the turbine of the gas generator. This makes it possible to optimize the efficiency.

In an embodiment, the manifold makes it possible to mix a flow having crossed the turbine of the gas generator and a bypass flow at the level of the compressor of the gas generator. This makes it possible to more easily uniformize the pressures for the mix of flows.

Preferably, the bypass flow is drawn at a stage of the compressor having a pressure equivalent to the pressure at the outlet of the turbine.

The turbine rotationally drives the compressor via a mechanical shaft.

In an embodiment, the gas generator is single-spool, i.e. it comprises only one turning body of compressor and turbine.

In an embodiment, the gas generator is a twin-spool turbomachine wherein the compressor comprises a low-pressure compressor and a high-pressure compressor, wherein the bypass flow is drawn between the two compressors.

In an embodiment, the gas generator is a bypass turbomachine comprising a fan downstream of which are a secondary path and a primary path, the primary path including the compressor, the combustion chamber and the turbine, wherein the bypass flow is drawn off the secondary path.

In an embodiment, the gas generator is a twin-spool bypass turbomachine wherein the compressor comprises a low-pressure compressor and a high-pressure compressor, and wherein a secondary path and a primary path are defined downstream of the low-pressure compressor, the primary path including the combustion chamber and the turbine, wherein the bypass flow is drawn off the secondary path.

In an embodiment, the bypass flow is a flow coming directly from the outside air.

Advantageously, so that the air brought to the propulsion module is compressed, the turbine is configured to expand the air at the outlet to a pressure greater than 4 bars, and preferably between 4 and 8 bars.

In an embodiment, the compressed-air turbine of the propulsion module is a radial feed turbine, preferably centripetal.

In an embodiment, the manifold or the propulsion modules comprise means for controlling the flow rate, such as valves, nozzle guide vanes with variable pitch or variable geometry, to control the respective supply of the propulsion modules with compressed air.

The application also relates, according to this first aspect, to an assembly comprising two propulsion units as described previously, and a crossover duct, said channel pneumatically interconnecting the two manifolds so that the gas generator of the first or second propulsion unit can supply compressed air to at least one propulsion module of the second or first propulsion unit respectively.

Preferably, each generator of a propulsion unit can symmetrically power at least some of the propulsion modules of the two propulsion units.

The application provides, in a second aspect, a compressed-air propulsion module for an aircraft propulsion unit, comprising:
  a fan,
  a compressed-air turbine, configured to rotationally drive the fan, the compressed-air turbine being a radial feed turbine.

The radial feed turbine is moreover preferably centripetal.

Such a radial feed turbine has a high longitudinal compactness with a lateral air distribution, which simplifies its incorporation into propulsion units of small size by comparison with turbomachines with axial turbines, very widespread in aircraft engines of over 50 kN of thrust. It is then easier to onboard several propulsion modules (for example four per aircraft side).

The rotation speeds of these turbines are moreover appropriate with the rotation speeds of the fan.

The term "radial" should be understood to mean that the air intake occurs radially with respect to the turbine axis. In other words, the turbine comprises a longitudinal axis corresponding to an axis of rotation of the turbine and the turbine comprises a compressed-air inlet disposed orthogonally to the longitudinal axis.

In an embodiment, the propulsion module comprises a reduction gear, for example mechanical such as an epicyclic gear, disposed between the turbine and the fan, in order to have a fan that turns less fast than the turbine.

In an embodiment, the turbine comprises a nozzle guide vane with variable pitch or variable geometry.

The compressed-air propulsion module advantageously comprises a casing of the fan (known as a fan casing) and an inner casing (also known as a core casing), the volume between the fan casing and the inner casing defining a flow path for the air flow crossing the propulsion module and wherein the inner casing comprises the turbine.

The compressed-air turbine advantageously comprises a compressed-air inlet duct crossing the inner casing, to supply the turbine.

According to another aspect, the invention also relates to an aircraft having a fuselage which is defined as having two sides, each side comprising a wing, the aircraft comprising an assembly of at least one propulsion unit as described previously, or even two propulsion units as described previously or an assembly comprising two propulsion units as described previously (in this case each propulsion unit is respectively mounted on one of the two sides). The propulsion modules can be attached to the fuselage, downstream of the wing.

PRESENTATION OF THE DRAWINGS

Other features, aims and advantages of the application will become apparent from the following description, which is purely illustrative and non-limiting, and which must be read with reference to the appended drawings, wherein:

FIG. 1a schematically represents a known architecture.

FIG. 1b schematically represents a known architecture.

FIG. 2a schematically represents and illustrates an architecture in accordance with an embodiment of the invention.

FIG. 2b schematically represents and illustrates an architecture in accordance with an embodiment of the invention.

DETAILED DESCRIPTION

Figure 1A:
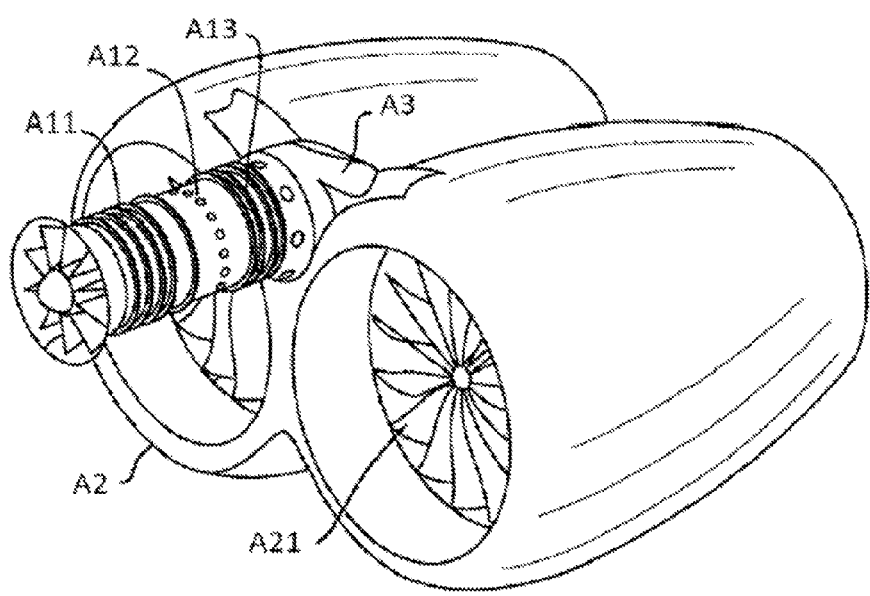
Figure 1B:
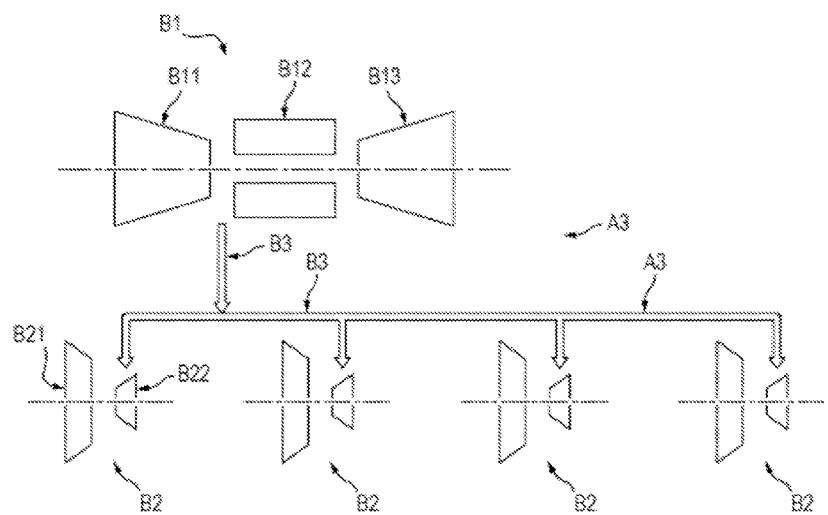
Figure 2A:
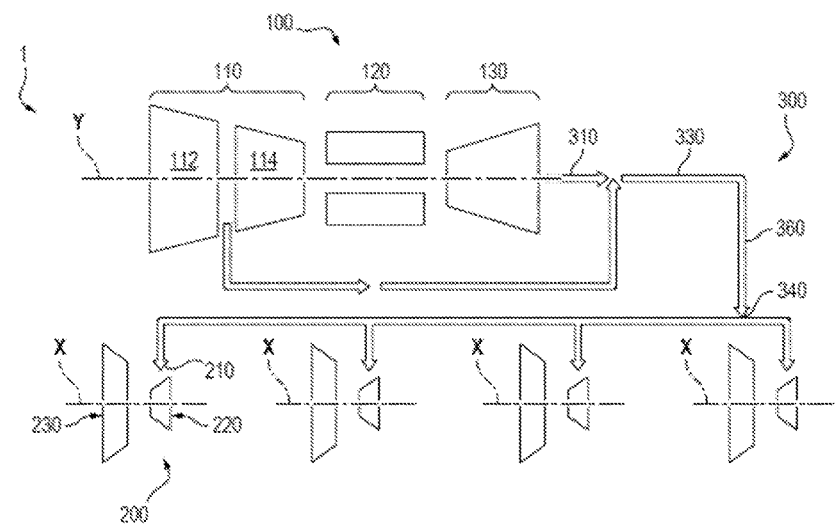
Figure 2B:
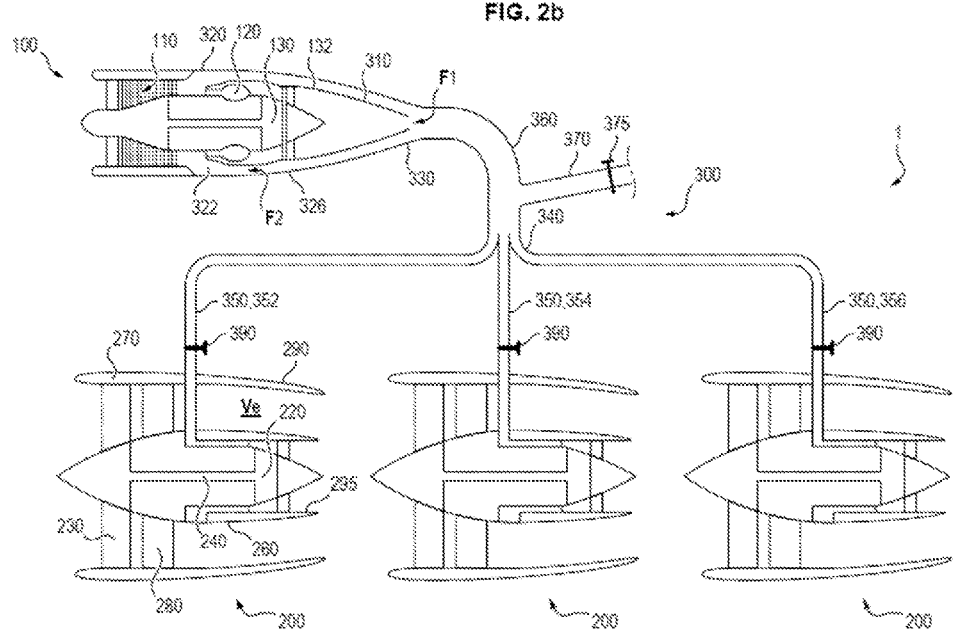
Figure 3A:
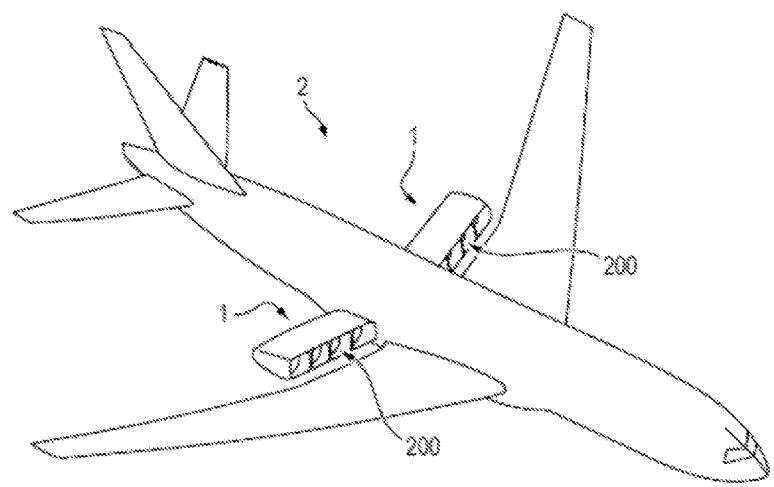
FIG. 3a illustrates a possible mounting on an aircraft of the propulsion unit according to an embodiment of the invention.
Figure 3B:
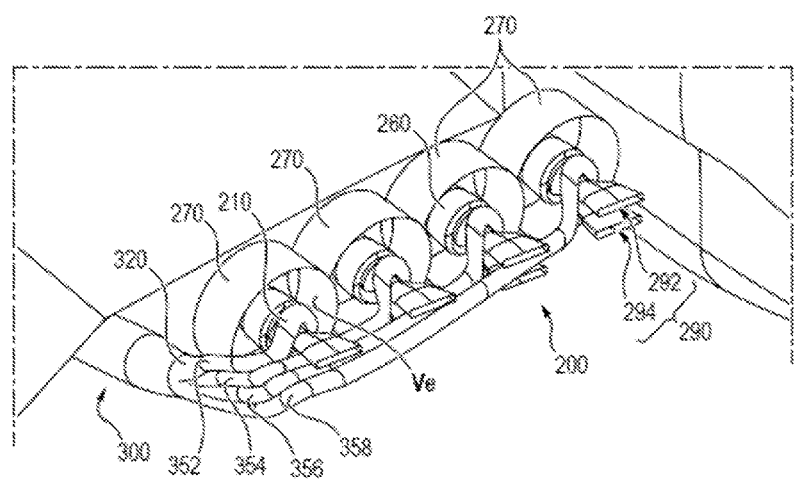
FIG. 3b illustrates a possible mounting on an aircraft of the propulsion unit according to an embodiment of the invention.
Figure 3C:
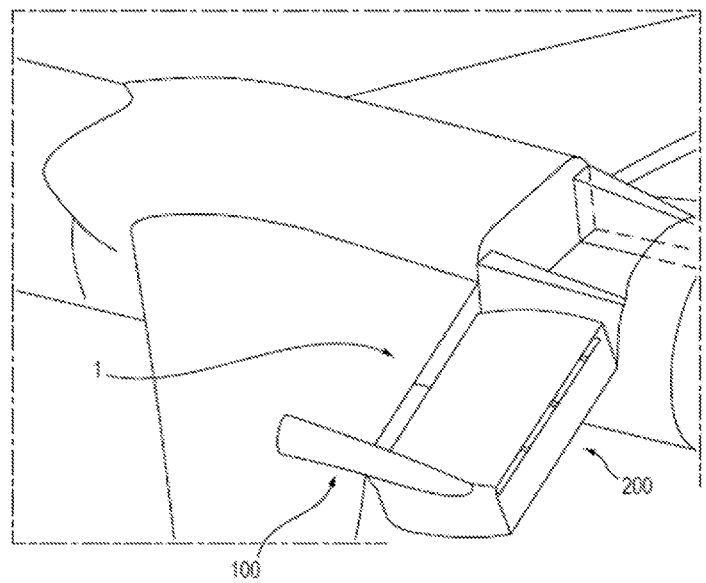
FIG. 3c illustrates a possible mounting on an aircraft of the propulsion unit according to an embodiment of the invention.

With reference to FIGS. 2a and 2b, a propulsion unit 1 according to an embodiment will now be described. This propulsion unit 1 can be integrated onto an aircraft (with fixed canopy), as illustrated in FIGS. 3a, 3b 3c. Moreover, a compressed-air propulsion module, usable preferably in the propulsion unit, will be shown in relation to FIGS. 4a, 4b.

The propulsion unit 1 comprises a gas generator 100, configured to generate compressed gases, and a plurality of compressed-gas propulsion modules 200, configured to be rotationally driven by the compressed gases coming from the gas generator 100. The gas generator 100 and the propulsion modules 200 are pneumatically linked by a manifold 300 (which includes a set of pipes and/or valves and others flow control means) used to convey compressed air. This will be loosely described as "compressed air", whereas in reality it is a gas mixture comprising other molecules than that normally forming air (particularly those resulting from the combustion of fuel). The compressed air here functions as a work fluid, to transmit energy between the gas generator 100 and the propulsion modules 200.

The propulsion modules 200 are powered in parallel by the gas generator 100. The known advantages of such a propulsion unit 1 have been detailed in the introduction.

The number of propulsion modules 200 varies between two and more than four, as a function of the dimensioning of the gas generator 100 and of the propulsion modules 200.

The Gas Generator

The gas generator 100 conventionally comprises, in the direction of flow of the air flow, a compressor 110, a combustion chamber 120 then a turbine 130. The turbine 130 is connected to the compressor 110 by a shaft (not illustrated), to form a "spool". The compressor 110 receives air at the total external pressure and compresses it to inject it into the combustion chamber 120 where it is mixed with fuel then ignited. The combustion gases escape through the turbine 130, where they expand, driving the latter in rotation about a longitudinal axis Y. An exhaust nozzle 132 is used to channel the outgoing flow.

In a preferred variant, the gas generator 1 is twin-spool or triple-spool.

The compressor 110 then comprises several compression sections 112, 114 (two in FIG. 2a). In a known manner, upstream is the compression section 122 known as the low-pressure compressor (or booster) and downstream is the compressor section 114 known as the high-pressure compressor. Each compression section 112, 114 is itself formed by several compression stages.

Similarly, the turbine 130 then comprises several sections, including in particular a low-pressure turbine and a high-pressure turbine (not illustrated), respectively driving the low-pressure compressor 112 and the high-pressure compressor 114 through dedicated concentric transmission shafts. This is referred to as a low-pressure spool, high-pressure spool or even intermediate spool.

However, in a variant, the gas generator 1 is single-spool (only one turning spool, i.e. a single compressor, a single turbine, and a single shaft).

The compression ratio is expressed as the ratio of the total pressures between the inlet and outlet sections of said compressor, measured at an operating point corresponding to the maximum propulsive power obtained at the ground (zero altitude) static point (zero Mach). By way of example, in the single-spool variant, this compression ratio can be between 10 and 15. By way of example, in the twin-spool variant, the longitudinal axis 112 can have a compression ratio between 3 and 10 and the high-pressure compressor 114 can have a compression ratio between 5 and 20.

The temperature at the inlet of the turbine 130 is generally between 1600 and 1900 K.

To generate pressurized gas, the turbine 130 does not expand to an atmospheric pressure but to a minimal pressure of a few bars. For example, the turbine 130 (or its last section, or the last stage of the section of the turbine) expands to a pressure at least equal to 4, 5 or 6 bars (for the maximum ground static power maximum propulsive power operating point.) Specifically, the last expansion must occur in the propulsion module 200. Typically, the pressure is between 4 and 8 bars.

The expansion ratio of the turbine does however remain greater than three.

The gas generator 100 may be a single-flow or bypass generator. The bypass can be embodied either with a fan upstream of two paths (a primary path comprising the compressor 110, the combustion chamber 120 and the turbine 130, and a secondary path surrounding the primary path), or with a low-pressure compressor 112 upstream of two paths (the primary path comprising the high-pressure compressor 114, the combustion chamber 120 and the turbine 130, and a secondary path surrounding the primary path). It is respectively a bypass turbomachine with a high bypass ratio or a low bypass ratio. Here a distinction is made between a fan and an LP compressor (this latter generally comprising several stages whereas the fan contains only a single stage).

In a preferred variant, the gas generator 100 has no propulsive function: it simply serves to generate pressurized gas.

Alternatively, the gas generator 100 can have a propulsive function, via the re-use of a portion of the gas from the turbine 130 through a nozzle with a propulsive purpose.

The Compressed-Air Propulsion Module

Figure 4A:
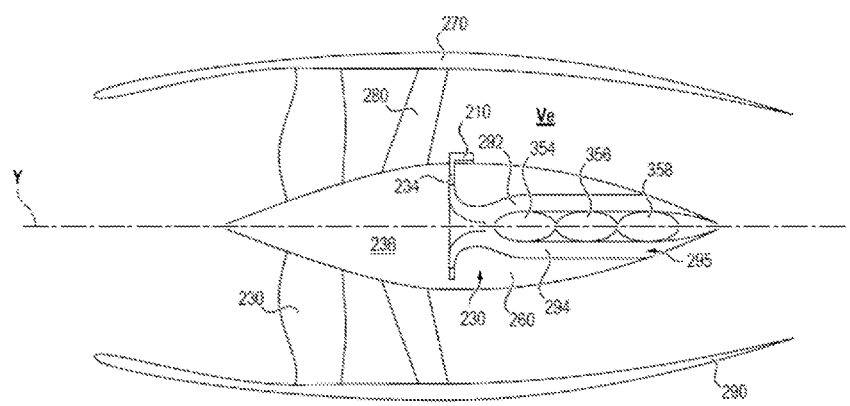
FIG. 4a illustrates a possible embodiment for a propulsion module according to an embodiment of the invention.
Figure 4B:
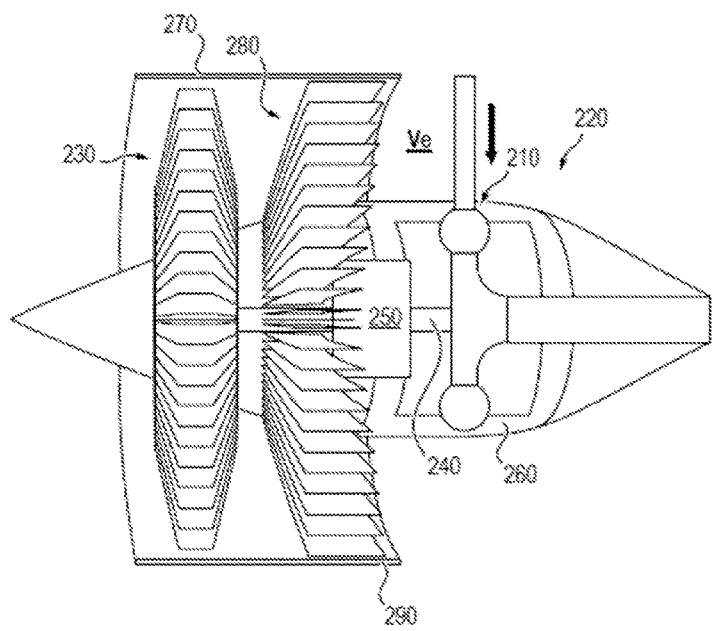
FIG. 4b illustrates a possible embodiment for a propulsion module according to an embodiment of the invention.

Illustrated in FIGS. 4a and 4b, the compressed-air propulsion module 200 comprises a compressed-air inlet duct 210 (which receives the compressed air from the gas generator 100 via the manifold 300), a turbine 220 and a fan 230. The turbine 220 rotationally drives the fan 230. A longitudinal axis X of rotation is defined for the turbine 220 and the fan 230.

The plurality of compressed-air propulsion modules 220 therefore have separate longitudinal axes X. For thrust reasons, these longitudinal axes X are generally parallel (but not colinear).

Similarly, these axes X of propulsion modules 200 are not colinear with the longitudinal axis Y of the gas generator 100 (and, as previously stated, each axis X is non-colinear with another axis X).

The compressed-air propulsion module 200 will be described in detail below.

The Manifold

The manifold 300 has the function of drawing air flows to conduct them to the propulsion modules 200. The manifold 300 comprises two intakes 310, 320 for drawing two different air flows F1 and F2 of the gas generator 100.

The first intake 310 is used to draw an air flow F1 that has crossed the combustion chamber 120 of the gas generator 100. In practice, the first intake 310 collects an air flow which has crossed the turbine 130 and advantageously collects it at the outlet of the turbine 130. Preferably, the entirety of the air flow at the outlet of the turbine is drawn by the first intake 310.

The second intake 320 is used to draw an air flow F2 that has not crossed the combustion chamber 120 of the gas generator 100. Such a flow F2 is known as the "bypass flow". In this respect there are several variants which will now be described in detail.

Downstream of the intakes 310, 320 is a mixer 330. The mixer 330 is a portion of the manifold 300 inside which the two flows F1, F2 are mixed. At the outlet of the mixer 330, the static pressure is uniform in the manifold 300. The mixer 330 may consist in a simple pipe without any particular mechanism (for example two substantially concentric channels which become a single channel where the flows mix, as illustrated in FIG. 2b).

Advantageously, the ratio (in mass flow rate) of the flows F2–F1 is between 1% and 50%, or even 1% and 30%. This is expressed as a bypass ratio between 1 and 30%. For 100 kg of air per second of the flow F1 (crossing the combustion chamber), there is between 1 and 30 kg of air per second of the bypass flow F2 (not crossing the combustion chamber). In bypass ratio notation, this gives a ratio between 1:100 and 30:100.

The ratio may advantageously be between 1:100 and 20:100. According to an example, the ratio can be located at around 1:10.

The air supplying the propulsion modules 200 therefore comes from two separate sources. The first source, the flow F1, makes it possible to provide the required energy supply to rotationally drive the thrusters, with a high temperature and pressure. The second source, the bypass flow F2, makes it possible, by mixing, to reduce the temperature of the flow F1 to a temperature more acceptable to the material of the manifold 300. This therefore allows for a longer, lighter and cheaper pipe. Thus the position of the propulsion modules 200 can be made more remote with respect to the gas generator 100.

By way of example, the speed of flow through the manifold 300 is of about 0.3 Mach.

In an embodiment, for an airplane of over 20 t of empty mass or for a thrust by propulsive assembly of over 50 kN, there is more than 5 m of pipe, more than three times the diameter of the fan 230 of the propulsion module 200, between the first intake 310 of the gas generator and the air inlet 210 of the propulsion module 200.

Downstream of the mixer 330, when the two flows F1, F2 are mixed, a divider is found 340 which is configured to distribute the air flow rate between the different propulsion modules 200. The divider 340 is a portion of the manifold 300 from which point the latter divides into several branches 350, 352, 354, 356. It may consist of a single pipe. Each branch 352, 354, 356 is then connected to an air inlet 210 of the propulsion module 200 that said branch supplies.

Between the mixer 330 and the divider 340, provision is made for a transmission duct 360. It is a single pipe.

In a preferred variant, the second intake 320 of the manifold 300 makes it possible to draw the bypass flow F2 at the level of the compressor 110, i.e. the drawn air has been compressed by the compressor 110. In this sense, the second intake 320 can structurally resemble a bleed, with the so-called VBV (Variable Bleed Valves). The VBV (and therefore the second intake 320) are valves positioned in the primary path and which have the function of expelling a portion of the air of the primary path to expel flows and/or regulate pressure. They can be open or closed in order to regulate the pressure at the level of the compressors or between the compressors.

FIG. 2b, the air is drawn at the compressor 110 outlet, before its entry into the combustion chamber 120.

When the compressor 110 comprises two sections (low-pressure compressor 112 and high-pressure compressor 114, rotationally driven by low-pressure and high-pressure turbines respectively, which are not illustrated), the second intake 320 of the manifold 300 advantageously draws the bypass flow F2 between the two sections (plane 25 according to naming conventions).

Advantageously, the drawing, i.e., the location of the second intake 321, is done at a level (or a stage) of the compressor 110 where the pressure is identical or substantially identical to that at the outlet of the turbine 130. This allows a uniform mixing of the flows F1, F2 while limiting perturbations.

The second intake 320 can take the form of a ring 322 which then divides into a plurality of channels 326 which carry the flow F1 toward the flow coming from the turbine 130, to perform the mixing. Provision can be made for scoops.

Alternatively, a double wall extends over an angular portion to serve as thermal shield at the hot parts (combustion chamber 120, turbine 130). These are then annular channels extended along an annular direction.

The bypass flow F2 preferably flows along the inner casing of the gas generator 100 (see FIG. 2b) to limit load losses. The channels 326 then surround the nozzle 132, which serves as a first intake 310. The flows F1 and F2 then mix in the mixer 330.

In this variant, the gas generator 100 is advantageously single-flow (by contrast with bypass turbomachines—the bypass flow F2 not being considered here as a flow in that sense). The bypass flow F2 inside the channels 326 and lining the combustion chamber 120 is used to cool the latter.

In another non-illustrated variant, the gas generator 100 is a bypass turbomachine: two concentric flows, including the primary flow or hot flow which crosses the whole gas generator passing through the compressor or compressors (low-pressure then high-pressure), the combustion chambers and the turbine or turbines (high pressure then low pressure), and including the secondary flow or cold flow which circumvents at least the high-pressure compressor, the combustion chambers, and the turbine or turbines. The two flows meet and mix in the manifold.

More specifically, the second intake 320 of the manifold makes it possible to draw a bypass flow at the level of a secondary path. Preferably, only a fraction of the secondary flow is sent to the bypass flow (not the entirety).

The second intake can take the form of a ring with a scoop for example, which is then divided into a plurality of annular channels, positioned between the primary path and the secondary path. The channels then carry the bypass flow F2 toward the primary path, at the outlet of the turbine, to perform the mixing.

Alternatively, a dual wall extends over an angular portion to serve as thermal shield for the hot parts (combustion chamber, turbine). These are then extended annular channels.

The flow preferably flows along the inner casing of the gas generator (see FIG. 2b) to limit load losses. The annual channel then surrounds the pipe, which serves as first intake. The flows F1 and F2 then mix in the mixer.

In a turbomachine with a low bypass ratio (less than 1:1), the separation between a primary path (with the high-pressure compressor 114, the combustion chamber 120 and the turbine 130) and the secondary path occurs downstream of the low-pressure compressor 112.

In a turbomachine with a high bypass ratio (greater than 5:1), the separation between a primary path (with the compressor 110—where applicable the low-pressure compressor 112 and the high-pressure compressor 114, the combustion chamber 120 and the turbine 130) and the secondary path occurs downstream of a fan, rotationally driven by the low-pressure turbine (where applicable via a mechanical reduction gear—for example an epicyclic gear).

The bypass ratio of the flows F1 and F2 should not be confused with the bypass ratio conventionally defined for a bypass turbomachine. The flows of the bypass ratio conventionally defined are immediately released to the outside air. The ratio F1/F2 is not a bypass ratio. In the context of the propulsion assembly 1, the bypass ratio corresponds to the mass flow rate of the air crossing the fans 230 of the propulsion modules 200 to the mass flow rate of the flow F1.

Finally, the bypass flow F2 is drawn from an air which has crossed the fan and which has therefore been slightly compressed (which means that the fan is itself a compressor). For the sake of clarity, a distinction is made between this variant and the variant of FIG. 2b, with the single spool.

In another non-illustrated variant, the second intake 320 makes it possible to draw a flow F2 from a flow directly coming from the outside air.

The manifold 300 has the function of drawing the flows F1 and F2 but also distributing them to the different propulsion modules 200.

In this regard, the divider 340 allows a division of the flows. However, it can happen that this divider is not enough because of the losses generated by the distances and/or shapes of the pipes which are not always identical between the different branches 352, 354, 356. To palliate this difficulty, provision is made for means 390 for controlling the flow rate in the branches, for example in the form of flow rate valves or in the form of a variable-geometry or variable-pitch manifold (with vanes for example). These control means 390 are positioned in the branches 352, 354, 356 or in the air inlet ducts 210, or even directly at the level of the turbines 220.

In addition, these means 390 for controlling the flow rate are used to adjust the operating regime of the propulsion unit 1. At low or partial ratings, the restriction of flow to a limited number of propulsion modules 200 is used to obtain an advantageous aerodynamic combination making it possible to have only propulsion modules 200 always operating close to their optimal aerodynamic design point. The other propulsion modules 200 then switch to windmilling mode and generate minimal drag.

The manifold 300 can be made of different materials, as a function of the gas temperature. Due to the temperature being lower than that at the outlet of the turbine, the pipe of the manifold 300 can be made of Inconel® (nickel and iron-based superalloy), ceramic, or Oxide-Oxide Ceramic Matrix Composite (CMC), which is suitable for temperatures of approximately 800° and pressures of 4 to 8 bars.

Manufacturing can be done by segment with a key mold to guarantee low roughness of the inner walls.

When several propulsion units 1 are mounted on an aircraft (see below for example, FIG. 3a), it may be useful to connect them pneumatically, so that one can palliate a failure in the other—in particular if a gas generator 100 is malfunctioning. In this respect, provision may be made for a crossover duct 370, illustrated in FIG. 2b. This latter interconnects the two transmission ducts 360 of the respective propulsion units 1 (or certain branches 350, 352, 354, 356, for crossover functionality only toward certain propulsion modules 220). A valve 375 is advantageously positioned in the crossover duct 370 to control the distribution of the flow rates between the two propulsion units 1.

In an embodiment, in the event of malfunction of a propulsion unit, the other propulsion unit can distribute its flow rate over a number x of propulsion modules 220, x being between 1 and n with n the total number of propulsion modules mounted on an aircraft. In addition, the distribution is preferably done symmetrically over the propulsion modules 220 of the propulsion units.

Thus, the gas generator of the first propulsion unit can totally or partially supply compressed air to the propulsion modules of the second propulsion unit—and vice versa.

The valve 375 is advantageously controlled by a control unit, such as a FADEC (not illustrated) or on the instructions of the pilot.

The Aircraft

The propulsion unit 1 can be mounted on the aircraft 2. More precisely, two propulsion units 1 may be mounted on each wing of the aircraft 2 or on each side of the fuselage (downstream of the wings, as illustrated in FIG. 3a or 3b).

In the illustrated example, a gas generator 100 supplies four propulsion modules 200 in parallel. The manifold 300 therefore divides at the level of the divider 340 into four ducts 352, 354, 356, 358, each leading to a propulsion module 200.

A particular mounting of the propulsion unit is described in an application of the same applicant and with the same date.

The Compressed-Air Propulsion Module (FIGS. 4a and 4b)

The turbine 220 rotationally drives the fan 230 via a shaft 240. A reduction gear 250 may be inserted between the two in order to limit the rotation speed of the fan 230, the blade tips of which produce noise when supersonic speed is reached. The reduction gear is for example mechanical and includes an epicyclic gear.

By way of example, the reduction gear has a reduction ratio between 4 and 10.

The fan 230 typically has a diameter of dimensions less than a diameter between 50 cm and 150 cm.

In a preferred variant, the turbine 220 is a radial feed turbine. The radial feed turbine 220 receives compressed air along a radial direction with respect to the direction of rotation of the turbine.

Such a turbine makes it possible to reduce the overall longitudinal dimensions, while having a convenient lateral distribution. In addition, this type of turbine is adapted to the rotation speeds of the fan 230 (the reduction gear 250, if present, can be smaller). It is then easier to implement a plurality of propulsion modules on an aircraft (four per side for example).

Figure 5:
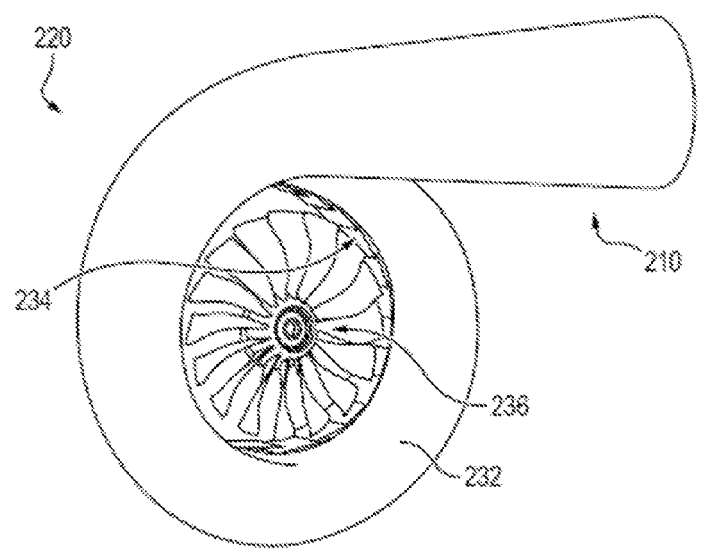
FIG. 5 illustrates an embodiment of a centripetal turbine.

More precisely, the radial feed turbine 230 is a centripetal radial feed turbine as illustrated in FIG. 5, i.e. the air flow undergoes a non-axial modification of its main direction of flow, approaching the axis of rotation X of the turbine.

The turbine 230 preferably comprises a scroll 232, the aim of which is to accelerate the flow rate of compressed air. A nozzle guide vane 234, at the tip of the scroll 232, then distributes the air over a rotationally movable wheel 236, forming a single part with the shaft 240.

The nozzle guide vane 234 typically comprises vanes (references 234 denote the actual vanes). These vanes can be fixed, with variable pitch or variable geometry (and driven by a control unit such as a FADEC or on the instructions of the pilot). In both the latter cases, these nozzle guide vanes can be part of the means 390 for controlling the flow rate, or else constitute additional control means, intended to optimize the own functionality of the propulsion module 200 rather than managing the overall properties of the propulsion unit 1.

The propulsion module 200 further comprises an inner casing 260, which houses the turbine 220, the shaft 240 and the reduction gear 250 where applicable. Around it, the propulsion module 200 comprises a casing of the fan 270. The volume between the casing of the fan 270 and the inner casing 260 defines a flow path Ve, at the entrance of which the fan 230 is found. Stators 280 (a stator vane ring for example, known as Outlet Guide Vanes, OGV) are disposed in the flow path, downstream of the fan 230, to straighten the air flow before its exhaustion. These stators 280 also generally have a beam function to take up the forces and bear the inner casing. Provision can be made for an outlet nozzle 290 (Variable Area Fan Nozzle of VAFN), to expel the flow crossing the fan 230. Provision can also be made for thrust reversers (with or without a grille, part of the VAFN or not etc.)

In the arrangement illustrated in FIGS. 3a, 3b and 3c, according to the position of the turbofan 200, the latter can house in its casing 260 a portion of the branches 354, 356 leading to the respective air inlet ducts 210 of the adjacent propulsion module or propulsion modules 200, which transversally cross the longitudinal axis Y of said casing 260. The branches 354, 356 therefore cross the casing 260 on either side.

Thus for the propulsion module closest to the gas generator there are three portions of the branches 354, 356 crossing the inner casing 260, for the adjacent propulsion module 200 there are two portions of the branches 354, 356 and so on.

In the same way, the portions of the branches 354, 356 of the furthest propulsion modules cross the flow path Ve of the closest propulsion modules.

The propulsion module 200 further comprises a so-called "primary" exhaust nozzle 295, which allows the gas crossing the turbine 220 to escape into the atmosphere and contribute to the overall propulsive force. This exhaust nozzle 290 is formed of two forks 292, 294, typically parallel, downstream of the turbine 220 in order to accommodate the transversal passage of the air inlet ducts 210 of the other propulsion modules 200. With respect to this, the two forks 292, 294 extend on either side of the air inlet ducts 210 (if the air inlets 210 extend horizontally, the forks 292, 294 extend above and below).

A Few Examples of Values

The propulsion unit 1 has a reasonable efficiency for a reasonable mass, without resorting to complex technology. The gain in SFC (Specific Fuel Consumption), i.e. consumption of fuel with respect to its power, can be of 30% at take-off (at Mach 0.25) and 10% in cruise conditions (at Mach 0.78) with respect to a bypass twin-spool turbomachine under the wing having and identical thrust and a comparable level of technology.

The bypass ratio of the propulsion unit (which differs from the bypass rate stated for the gas generator), i.e. the ratio of the sum of the mass flow rates crossing the fans 230 of the propulsion modules 200 to the mass flow rate of the gas generator 100 is greater than 20:1 (from 26:1 to 35:1 at take-off and from 30:1 to 40:1 in cruise).

The compression ratios of the fans 230 of the propulsion modules 200 are substantially of 1.15 at take-off and of 1.26 in cruise.

In an example of dimensioning allowing for a similar power to that of a turbomachine with a thrust at take-off of over 370 kN and a specific fuel consumption of less than 0.29 kg/DaN·h, the low-pressure compressor has a ratio of 6, the high-pressure compressor has a ratio of 8.3, the combustion chamber has a temperature of 1700 K, the bypass ratio of the flows F1 and F2 is 1:10, the pressure in the manifold is of 6.74 atm, for a temperature of 1053 K and a mass flow rate of 110 kg/s, to supply four propulsion modules, for which the compression ratio of the fan is 1.15.

The invention claimed is:

1. A propulsion unit comprising:
 a gas generator comprising:
  a compressor;
  a combustion chamber configured to receive air compressed by the compressor and exhaust exhausted air; and
  a turbine configured to rotationally drive the compressor using the exhausted air;
 two compressed-air propulsion modules, each compressed-air propulsion module comprising a fan and a compressed-air turbine configured to rotationally drive the fan; and
 a manifold comprising:
  a first intake configured to collect the exhausted air from the combustion chamber of the gas generator;
  a second intake including a channel configured to collect at least one bypass flow from the gas generator; and
  a mixer configured to collect and mix the exhausted air with the at least one bypass flow to obtain compressed air;
 wherein the bypass flow is collected outside of the propulsion unit such that the bypass flow does not enter the compressor of the propulsion unit;
 wherein the compressed air is supplied to the compressed-air turbines from the mixer of the manifold; and
 wherein at least one of the manifold and the compressed-air propulsion modules comprises a flow control device configured to control supply of the compressed-air turbines with compressed air.

2. The propulsion unit of claim 1, wherein the gas generator comprises a longitudinal axis corresponding to an axis of rotation of the turbine and each compressed-air propulsion module comprises a longitudinal axis corresponding to an axis of rotation of the corresponding compressed-air turbine, wherein at least one of the longitudinal axes of the compressed-air propulsion modules is not colinear with the longitudinal axis of the gas generator.

3. The propulsion unit of claim 1, wherein the manifold collects all or at least a majority of the exhaust air crossing the turbine of the gas generator.

4. The propulsion unit of claim 1, wherein the portion of the air exhausted by the combustion chamber of the gas generator is collected at an outlet of the turbine of the gas generator wherein the bypass flow is collected at the compressor of the gas generator.

5. The propulsion unit of claim 1, wherein the gas generator is a bypass turbomachine comprising an additional fan, a secondary path and a primary path which extend downstream of the additional fan, wherein the primary path includes the compressor, the combustion chamber and the turbine, wherein the bypass flow is collected in the secondary path.

6. The propulsion unit of claim 1, wherein the turbine is configured to expand air at a pressure greater than 4 bars.

7. The propulsion unit of claim 1, wherein the compressed-air turbine is a radial feed turbine.

8. The propulsion unit of claim 1, wherein the flow control device comprise at least one of a valve, a nozzle guide vane with a variable pitch and a nozzle guide vane with a variable geometry.

9. The propulsion unit of claim 1, wherein the gas generator comprises a longitudinal axis corresponding to an axis of rotation of the turbine and each compressed-air propulsion module comprises a longitudinal axis corresponding to an axis of rotation of the corresponding compressed-air turbine, wherein the longitudinal axes of the compressed-air propulsion modules is not colinear with the longitudinal axis of the gas generator.

10. The propulsion unit of claim 1, wherein the portion of the air exhausted by the combustion chamber of the gas generator which is collected and mixed by the manifold with the bypass flow is collected at an outlet of the turbine.

11. The propulsion unit of claim 1, wherein the compressed-air turbine is a centripetal turbine.

12. An assembly comprising two propulsion units according to claim 1 and a crossover duct that pneumatically interconnects the manifold of the propulsion units so that the gas generator of one of the propulsion units is capable of supplying compressed air to at least one propulsion module of the other propulsion unit.

* * * * *